US007788916B2

(12) United States Patent
Brockman et al.

(10) Patent No.: US 7,788,916 B2
(45) Date of Patent: Sep. 7, 2010

(54) HYDRAULIC SYSTEM FOR UTILITY VEHICLES, IN PARTICULAR AGRICULTURAL TRACTORS

(75) Inventors: Andreas Brockman, Bidingen (DE); Michael Martens, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 296 days.

(21) Appl. No.: 11/679,720

(22) Filed: Feb. 27, 2007

(65) Prior Publication Data

US 2007/0199440 A1 Aug. 30, 2007

(30) Foreign Application Priority Data

Feb. 28, 2006 (GB) ................................ 0603991.1

(51) Int. Cl.
*F16D 31/02* (2006.01)

(52) U.S. Cl. .......................................... 60/427; 60/422

(58) Field of Classification Search .................. 60/422, 60/427, 452
See application file for complete search history.

(56) References Cited

U.S. PATENT DOCUMENTS

| | | | | |
|---|---|---|---|---|
| 4,573,319 | A * | 3/1986 | Chichester | 60/422 |
| 4,716,933 | A | 1/1988 | Stoever et al. | |
| 5,029,067 | A * | 7/1991 | Nishida et al. | 60/421 |
| 5,048,293 | A * | 9/1991 | Aoyagi | 60/427 |
| 5,167,121 | A | 12/1992 | Sepehri et al. | |
| 5,182,908 | A | 2/1993 | Devier et al. | |
| 5,520,087 | A * | 5/1996 | Takamura et al. | 60/422 |
| 6,810,663 | B2 * | 11/2004 | Konishi et al. | 60/422 |

FOREIGN PATENT DOCUMENTS

| | | |
|---|---|---|
| GB | 2357344 | 6/2001 |
| JP | 2140332 | 11/1988 |

* cited by examiner

*Primary Examiner*—Michael Leslie

(57) ABSTRACT

A hydraulic system for utility vehicles is disclosed for prioritized pressure medium supply to internal and external pressure medium consumers (6, 11, 12), which are fed via load sensing spool valves (20, 26), the external pressure medium consumers (11, 12) being supplied with pressure medium via a priority valve (17). In order to improve the work quality of an implement driven by an external pressure medium consumer, the present invention provides that priority can be selectively assigned to the internal (6) or the external (11, 12) pressure medium consumers. It is thus possible for the driver, in order to ensure optimum operation of the utility vehicle in critical situations, to give priority to external pressure medium consumers. In this way during operation of an implement for dispersion of substances, better work quality can be attained, as a reduced supply and thus slower function of the internal power lift are accepted.

8 Claims, 1 Drawing Sheet

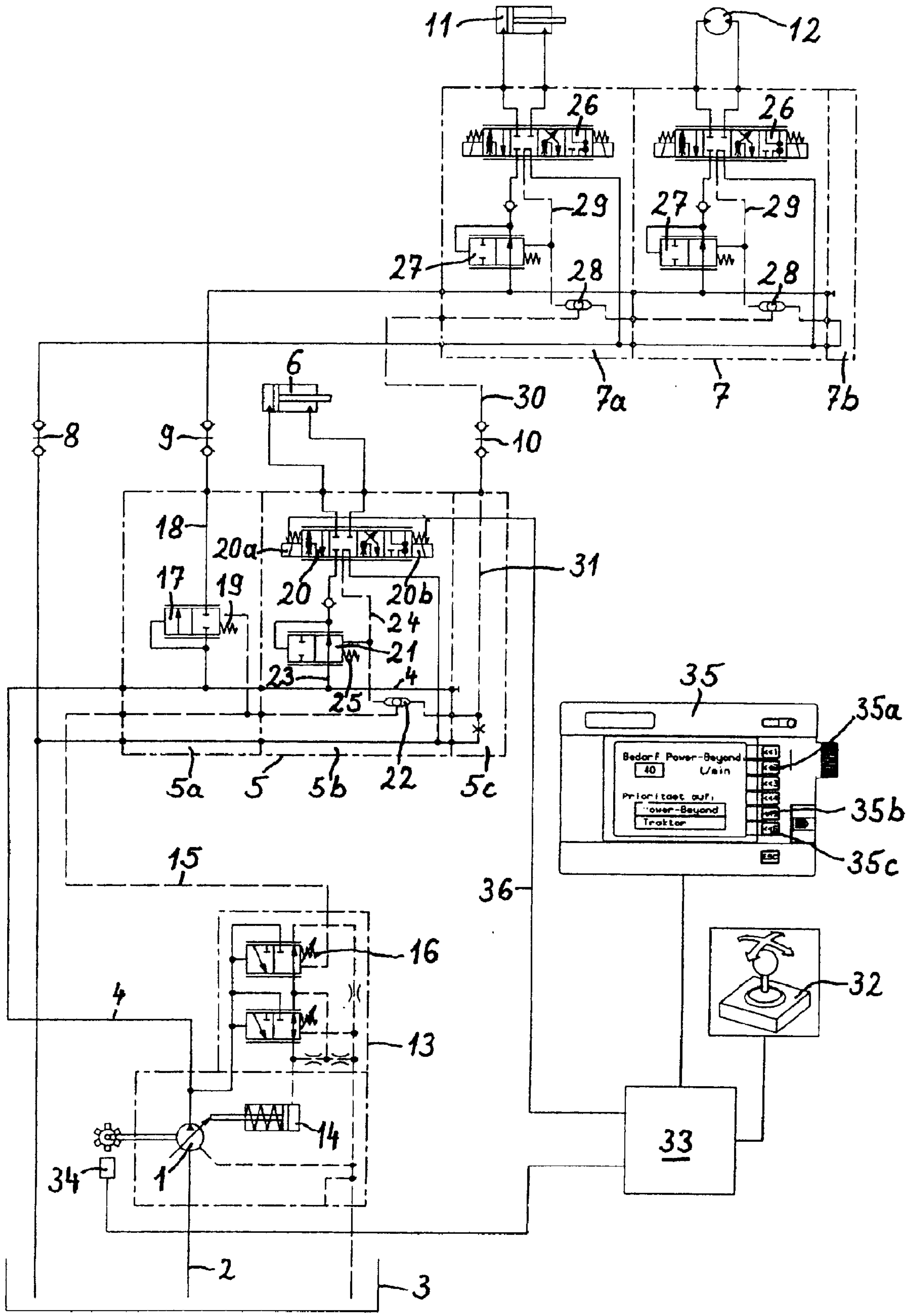
11
12
26
26
27
29
27
29
28
28
7a
7
7b
6
30
8
9
10
18
20a
31
17
19
20
20b
24
21
23
4
25
22
5a
5
5b
5c
35
35a
Bedarf Power-Beyond
40
l/min
Prioritaet auf:
Power-Beyond
Traktor
35b
35c
ESC
15
36
16
32
4
13
33
14
34
1
2
3

HYDRAULIC SYSTEM FOR UTILITY VEHICLES, IN PARTICULAR AGRICULTURAL TRACTORS

The invention relates to a hydraulic system for utility vehicles, in particular agricultural tractors, with a regulated hydraulic pump for the prioritised supply of pressure medium to internal and external pressure medium consumers, which are fed via load sensing spool valves, the external pressure medium consumers being supplied with pressure medium via a priority valve. In the context of this invention the internal pressure medium consumers describes consumers fed via a load-sensing valve this is permanently installed on the vehicle itself. In the context of this invention it makes no difference whether the hydraulic consumer itself is installed on the vehicle (e.g. a cylinder to operate a front or rear 3-point-inkage or a front loader) or whether the consumer is installed on an implement (e.g. a cylinder to unfold the boom of a sprayer). The term external pressure medium consumers describes consumers fed via a load-sensing valve that is installed on an implement or attachment that is attached to (i.e. external to) the vehicle. It is the position of the load sensing valve that determines whether a consumer is internal or external.

The German utility model DE20 3004 010 530U1 describes and shows in FIG. 4 a hydraulic system of this kind for the pressure medium supply of internal and external pressure medium consumers. Apart from a priority valve, via which the external pressure medium consumers are supplied with pressure medium, the system contains further priority valves, which assign a certain priority to various internal pressure medium consumers. As internal pressure medium consumers the following are mentioned here: steering, vehicle brake, axle suspension and power hydraulics. Power hydraulics in this case comprise further pressure medium consumers such as front and rear power lifts and front loaders. The load-sensing lines going from the load sensing main slide valves of these pressure medium consumers are connected in tandem to the priority valves, so that a fixed preset priority can be assigned to each pressure medium consumer. In the embodiment shown, for safety reasons the highest priority is assigned to the internal pressure medium consumers: steering, vehicle brake and axle suspension. Afterwards the lowest priority of the internal pressure medium consumers is assigned to the pressure medium consumers: front and rear power lifts and front loaders supplied by the power hydraulics. Only the external pressure medium consumers, such as a hydraulically operated implement, have a still lower priority. In this way pressure medium consumers of higher priority can preferably be supplied with pressure medium, should the pressure medium flow demanded by several operating pressure medium consumers exceed the maximum flow rate of the hydraulic pump. This means however that in such cases the pressure medium supply to the external pressure medium consumers is always at least partly limited.

Situations are known however in which it is not expedient to give preference to the internal pressure medium consumers over the pressure medium supply to the external because the power capacity of the hydraulic system is not then exploited to an optimum. This is the case for example if the implement is an air seeder machine with a hydraulically driven fan, a crop sprayer with a hydraulically driven water pump or a manure spreader with a hydraulically driven spreading mechanism. Insufficient supply to such implements leads to a negative influence on the work pattern, that is to say seed, fertilizer or chemicals are not dispersed in the intended quantity/dosage.

The object of the present invention therefore consists in providing a hydraulic system of the type described in the preamble, with which in order to improve the work quality of an implement driven by an external pressure medium consumer the flow rate of the hydraulic pump is distributed to the operating pressure medium consumers to a degree desired by the driver.

To achieve this object it is proposed that a higher priority can be selectively assigned to the internal or the external pressure medium consumers. Thus it is possible for the driver, in order to ensure optimum operation of the utility vehicle in critical situations, to supply external pressure medium consumers with priority. In this way during the operation of an implement for the dispersion of substances, seed for example, over a wide area better work quality can be attained if a reduced supply and thus slower function of the internal power lift for example are accepted. Apart from the option for the driver to actively prioritise the internal or the external pressure medium consumers, if the driver takes no action the priority with regard to the internal pressure medium consumers remains as before.

A preferred embodiment of the invention, which requires only a few additional components and allows multiple use of already existing vehicle equipment, such as the CAN bus and the master computer, is described in Claim 2.

An embodiment of the invention is described below, by way of example only, with reference to the accompanying drawing which shows a circuit a diagram of a hydraulic system for an agricultural tractor.

In the circuit diagram a variable displacement hydraulic pump is referenced with 1, which takes in pressure medium via an intake line 2 from a pressure medium reservoir 3 and by way of a pressure line 4 feeds this to a tractor-mounted valve manifold 5. From here the pressure medium is distributed to internal pressure medium consumers 6. Via an external valve manifold 7, which is connected via hydraulic couplings 8, 9, 10 to the hydraulic system of the tractor, a further distribution takes place to external pressure medium consumers 11, 12. Examples of internal pressure medium consumers are single and double acting hydraulic motors (linear drives and rotary drives) for operating the front and rear power lifts as well as the rocker and loading shovel of a tractor-mounted front loader. Examples of external pressure medium consumers are single and double acting hydraulic motors to drive equipment which is mounted on the tractor or on implement drawn by the tractor and which are supplied via the hydraulic couplings 8,9,10.

A pressure and flow controller 13 is flanged onto the hydraulic pump 1, the purpose of which is to control via an adjustment piston 14 the flow rate of the pump 1 as a function of the load pressure of the operating pressure medium consumers communicated via a load sensing line 15 in such a way that a defined pressure gradient always prevails between the pressure line 4 and the load sensing line 15. The pressure gradient of approx. 20 bar required for operating internal pressure medium consumers 6 is adjusted by corresponding pre-tensioning of a compression spring 16. In all other respects such a pressure and flow controller 13 is presumed to be familiar and therefore is not described in detail.

The internal valve manifold 5 consists of a priority section 5*a*, a valve section 5*b* and a cover plate 5*c*, which are all bolted together to form a unit. Several valve sections 5*b* can be provided depending on the number of pressure medium consumers 6 to be operated. For the description of the embodiment used here as an example, however, it is assumed that only one valve section 5*b* is provided and thus only one internal pressure medium consumer 6.

The priority section 5*a* contains a priority valve 17, which lies in the pressure line 18 to the valve manifold 7 and on the one hand is subjected to the pressure in the pressure line 18 as well as on the other hand to the load pressure in the load sensing line 15 as well as to the force of a spring 19. This means that medium can only flow via the pressure line 18 to the valve manifold 7, if the hydraulic pump 1 is able to build up pressure which is greater than the highest load pressure in the load sensing line 15 plus the bias of the spring 19. For this purpose the pressure medium flow demanded by the pressure medium consumers 6, 11, 12 must be less than the maximum flow rate of the hydraulic pump.

The valve section 5*b* contains a solenoid operated spool valve 20 of the load sensing type, a pressure compensator 21 and a shuttle valve 22. The internal pressure medium consumer 6 is connected to the spool valve 20. It is supplied with pressure medium through the pressure line 23. Its load pressure is supplied via load sensing line 24, shuttle valve 22 and load sensing line 15 to the pressure and flow controller 13. The pressure compensator 21 is in the pressure line 23 to the spool valve 20 and by corresponding bias of a spring 25 allows a desired pressure gradient to be adjusted between the pressure line 4 and the load sensing line 24.

The external valve manifold 7 is located on an implement, for example a potato harvester, and consists of several valve sections 7*a*, whereby a valve section 7*a* is present for each pressure medium consumer 11, 12 operated with the implement, and a cover 7*b*. The structure of an external valve section 7*a* of this kind with a solenoid operated spool valve 26 of the load sensing type, a pressure compensator 27 and a shuttle valve 28 corresponds in structure and method of operation to a internal valve section 5*a*. Load sensing lines 29 going from the spool valves 26 conduct the load pressure of the external pressure medium consumers 11, 12 via the shuttle valves 28, load sensing lines 30, 31 to the shuttle valve 22.

A lever, for example in the shape of a joystick 32, serves to control the spool valve 20, which is used to operate the internal pressure medium consumer 6. The joystick 32 is linked to a master computer 33, to which a speed sensor 34 of the hydraulic pump 1, the solenoids 20*a*, 20*b* of the spool valve 20 and an input device 35 are connected. All these components are connected by a data communication line 36; CAN bus or PWM signals are used in the usual way.

The master computer 33 causes excitation of the solenoids 20*a* or 20*b* of the spool valve 20 as a function of the deflection of the joystick 32 from a neutral starting position, which represents a measure for the pressure medium demand of the internal pressure medium consumer 6, specified by the driver. For this purpose a table is stored in the master computer 33, which makes the connection between the deflection of the joystick 32 and the position of the spool valve 20 and/or the pressure medium flow to the pressure medium consumer 6. The input device 35 has three input options, via which the driver communicates to the master computer 33 the necessary information required for the normal function of the equipment including assignment of priority to the internal or external pressure medium consumers 6 and/or 11, 12.

Via a first input option 35*a* the driver can enter the pressure medium flow provisionally required by the external pressure medium consumers 11. A second input option 35*b* enables the priority to be assigned to the external pressure medium consumers 11, 12, while a third input option 35*c* permits prioritisation of the internal pressure medium consumers 6.

The hydraulic system illustrated can be operated in three different functional modes. For all modes it is presumed that the hydraulic pump 1 has a maximum flow rate of 100 liters per minute and is precisely able to cover the simultaneous pressure medium demand of the internal pressure medium consumer 6.

Mode 1: With No Priority Selection

The driver does not enter any commands in the input device 35. The master computer 33 therefore has no information about the demand of the external pressure medium consumers 11, 12 attached to valve manifold 7 or disregards possibly existing commands. In this case the priority valve 17 in a conventional way takes over distribution of the pressure medium supplied by the hydraulic pump 1 to the internal and external pressure medium consumers 6, 11, 12, wherein the internal pressure medium consumer 6 is prioritised. The pressure level which the hydraulic pump 1 is required to build up corresponds to the maximum load pressure in the load sensing line 15 leading to the pressure and flow controller 13 plus the pressure gradient, which is adjusted by means of the compression spring 16. If the pressure medium demand of the internal and external pressure medium consumers 6, 11, 12 remains less than the maximum flow rate of the hydraulic pump 1, this is able to build up the pressure required for operating the pressure medium consumers 6, 11, 12. On the other hand if the pressure medium demand of the pressure medium consumers 6, 11, 12 exceeds the maximum flow rate of the hydraulic pump 1, insufficient supply to the hydraulic system results. Due to this short supply the priority valve 17 will close, because the hydraulic pump I is not able to build up or maintain a system pressure sufficient to open and/or keep open the priority valve 17. The pressure medium flow via pressure line 18 to the external pressure medium consumers 11, 12 is therefore reduced by means of the priority valve 17 to the extent that the supply to the internal pressure medium consumer 6 is ensured and sufficient system pressure is maintained.

Mode 2: Priority to Internal Pressure Medium Consumer 6

This mode is particularly suitable for again changing over to mode 1 after using mode 3. The driver communicates the pressure medium demand of the external pressure medium consumers 11, 12 of 40 liters per minute for example to the master computer 33 via the first input option 35*a* of the input device 35. This for example may be a value provided by the manufacturers of the implements or an empirical value. In addition the master computer 33 via the third input option 35*c* of the input device 35 receives the command that in the event of insufficient supply to the hydraulic system the internal pressure medium consumer 6 is to be prioritised. If, during operation, the pressure medium demand of the internal pressure medium consumer 6 entered via the joystick 32 amounts to 100 liters per minute for example, the operational case of short supply ensues because, while the demand by all operating pressure medium consumers amounts to 140 liters per minute, the hydraulic pump 1 can only supply 100 liters per minute. The master computer 33 now calculates, as repeatedly calculated previously, the rate of supply to the hydraulic system from the data provided by the speed sensor 34 and the joystick 34. For this purpose in a first step the following arithmetical calculation is performed to first determine the current flow rate FMmax of the hydraulic pump 1:

$$FM\text{max}=n\times F\text{max}$$

where FMmax stands for the maximum flow rate in liters per minute, n for the speed of the hydraulic pump 1 and Fmax for the flow rate per rotation of the hydraulic pump 1

In a second step the following arithmetical calculation is performed;

$$FM\text{max}-\text{Biv}-\text{Bev}$$

where Biv stands for the pressure medium demand per minute of the internal pressure medium consumer 6 and Bev for the pressure medium demand per minute of the external pressure medium consumers 11, 12. Regardless of whether the result is positive or negative, the master computer 33 does not intervene further. Instead, as described for mode 1, the hydraulic control circuit of the priority valve 17 comes into effect.

Mode 3: Priority to External Pressure Medium Consumers 11, 12

The driver communicates the pressure medium demand of the external pressure medium consumers 11, 12 for example 40 liters per minute to the master computer 33 via the first input options 35*a* of the input device 35. In addition the master computer 33 receives the command via the second input option 35*b* of the input device 35 that if there is insufficient supply to the hydraulic system the external pressure medium consumers 11, 12 are to be prioritised. If during operation the pressure medium demand of the internal pressure medium consumer 6 entered via the joystick 32 amounts to 100 liters per minute for example, again the operational case of short supply ensues. The master computer 33 now calculates the rate of supply to the hydraulic system from the data provided by the speed sensor 34 and the joystick 32. For this purpose, in a first step, the following arithmetical calculation is carried out in order to first determine the current flow rate FMmax of the hydraulic pump 1:

$$FM\max = n \times F\max$$

whereby FMmax stands for the maximum flow rate in liters per minute, n for the rpm of the hydraulic pump 1 and Fmax for the flow rate per rotation of the hydraulic pump 1

In a second step the following arithmetical calculation is performed:

$$FM\max - \text{Biv} - \text{Bev}$$

whereby Biv stands for the pressure medium demand per minute of the internal pressure medium consumers 6 and Bev for the pressure medium demand per minute of the external pressure medium consumers 11, 12. If the result is positive, over supply prevails and the master computer 33 does not intervene further. If the result is negative, short supply prevails and a reaction of the computer follows. This results in the master computer 33 energising the solenoids of the spool valves 20 while rejecting the command of the joystick 32 and reducing the desired value Biv of the spool valve 20 of the internal pressure medium consumer 6 to a value at which the sum of the demands Biv and Bev corresponds to the maximum flow rate FMmax of the hydraulic pump 1.

The present invention thus provides a hydraulic system in which the prioritising of the flow to the internal and external consumers can easily be switched over so that in those operating circumstances where it is necessary for the external consumers to have priority this can easily be achieved. Also, by using load sensing control valves to control both the internal and external consumers the feedback of the flow requirement of these consumers is greatly simplified and no complex sensing of valve position or other consumers operating parameters is necessary. This means that the system can cope with all forms of consumers and the original system designer does not need to anticipate what types of consumer might be used.

The invention claimed is:

1. A hydraulic system for utility vehicles with a regulated hydraulic pump for the supply of pressure medium to internal and external pressure medium consumers via load sensing spool valves, the system comprising:

a priority valve through which the external consumers are supplied with pressure medium;

an input device that allows an operator to selectively set priorities to the internal and the external pressure medium consumers, such that the flow rate of the hydraulic pump is distributable to the operating pressure medium consumers to a degree desired by the operator, wherein the input device allows an operator to selectively set “no consumer priority”, “internal consumer priority” or “external consumer priority,” wherein the input device allows an operator to also set the pressure medium demand of the external consumers to be used when “external consumer priority” is set on the input device, and wherein the priority valve limits the pressure medium supply to the external pressure medium consumer, so long as the pressure medium demand of the internal and external pressure medium consumers exceeds the maximum flow rate of the hydraulic pump and “no consumer priority” or “internal consumer priority” is set on the input device;

a driver operated input for setting the pressure medium demand of each of the internal consumers via the respective spool valves;

a flow sensor for providing a signal indicative of the maximum flow rate being delivered by the pump, and a control unit that receives a signal denoting any pressure medium consumer priority set on the input device, the pressure medium demand of each of the internal consumers set on the driver operated input and the flow sensor signal, the control unit repeatedly calculating from the sensor signal the maximum flow rate being delivered by the pump, and, if “external consumer priority” is set on the input device, reducing the value of demand set on the driver operated input for the internal consumers so that the sum of the internal and external demands corresponds to the maximum flow rate being delivered by the pump, and, if “no consumer priority” or “internal consumer priority” is set on the input device and the sum of the set internal and external demands exceed the maximum flow rate being delivered by the pump, allowing the priority valve to limit the flow to the external consumers.

2. A system according to claim 1, wherein the flow sensor provides the speed of rotation of the pump, and the pump maximum flow rate is calculated from the equation $$FM\max = n \times F\max$$

where n=speed of rotation of the pump and Fmax=flow rate of pump per rotation.

3. A hydraulic system according to claim 1, wherein the hydraulic system is for agricultural tractors.

4. A hydraulic system according to claim 1, wherein the control system comprises a lever for operator control of the load sensing spool valves.

5. A hydraulic system according to claim 1, wherein the internal pressure medium consumers comprise single acting hydraulic motors.

6. A hydraulic system according to claim 1, wherein the internal pressure medium consumers comprise double acting hydraulic motors.

7. A hydraulic system according to claim 1, wherein the external pressure medium consumers comprise single acting hydraulic motors.

8. A hydraulic system according to claim 1, wherein the external pressure medium consumers comprise double acting hydraulic motors.

* * * * *